United States Patent [19]

Callahan

[11] Patent Number: 4,769,743

[45] Date of Patent: Sep. 6, 1988

[54] APPARATUS FOR MECHANICALLY ADJUSTING LIGHTING FIXTURE AZIMUTH AND ELEVATION

[76] Inventor: Michael Callahan, 201 W. 85th, New York, N.Y. 10024

[21] Appl. No.: 940,934

[22] Filed: Dec. 12, 1986

Related U.S. Application Data

[63] Continuation-in-part of Ser. No. 750,873, Jul. 1, 1985, Pat. No. 4,697,227.

[51] Int. Cl.[4] .................... G03B 15/02

[52] U.S. Cl. .................... 362/18; 362/272; 362/284; 362/428

[58] Field of Search .................... 362/16, 18, 268, 269, 362/272, 277, 284, 285, 286, 287, 296, 304, 428, 145

[56] References Cited

U.S. PATENT DOCUMENTS

| | | | |
|---|---|---|---|
| Re. 30,119 | 10/1979 | Tichenor | 362/299 |
| 1,284,661 | 11/1918 | Hall . | |
| 1,403,876 | 1/1922 | Sperry . | |
| 1,680,685 | 8/1928 | King . | |
| 1,747,279 | 2/1930 | Andreino . | |
| 1,876,511 | 9/1932 | Oberg et al. . | |
| 2,054,224 | 9/1936 | Levy . | |
| 2,097,537 | 11/1937 | Snyder . | |
| 2,659,038 | 10/1953 | Heyer | 315/316 |
| 3,139,604 | 6/1964 | Meiners et al. | 362/284 |
| 3,209,136 | 9/1965 | Fisher . | |
| 3,375,362 | 3/1968 | Klippert | 362/272 |
| 3,594,566 | 7/1971 | Kneisley | 362/268 |
| 3,783,263 | 1/1974 | Cruse . | |
| 4,112,486 | 9/1978 | Tovi | 362/419 |
| 4,460,943 | 7/1984 | Callahan | 362/276 |
| 4,663,698 | 5/1987 | Tomlinson | 362/284 |

FOREIGN PATENT DOCUMENTS

| | | | |
|---|---|---|---|
| 816456 | 8/1937 | France | 362/268 |
| 141399 | 4/1920 | United Kingdom . | |

OTHER PUBLICATIONS

Kneisley Electric Company Kni-Tron Super-Spot Data Sheet; 2/70; Cameleon Sarl Telescan Brochure and Data Sheet.

"Lighting Trusses on Tour", James L. Moody, *Theater Crafts,* vol. 16, No. 2, Feb. 1982, pp. 28-63.

Cameleon's Telescan; Telescan Mark II, Manufactured by Cameleon SARL, France.

*Primary Examiner*—Charles J. Myhre

*Assistant Examiner*—David A. Okonsky

*Attorney, Agent, or Firm*—Kenyon & Kenyon

[57] ABSTRACT

An improved apparatus for adjusting the azimuth and elevation of a light projector suitable for entertainment lighting, comprising a light source with associated light collecting and beam forming means producing an elongated beam having an optical centerline is disclosed. A means, typically a mirror, is used to redirect the beam at substantially right angles to the optical centerline, and is rotated to vary beam azimuth through a first plane. Both the light source and the means for redirecting are coupled to a common mechanical support, which is rotated around an effective pivot point perpendicular to the optical centerline and parallel to first plane, to vary beam elevation through a second plane at substantially right angles to the first plane. The unique advantages of the apparatus for remotely-adjusting fixtures and for systems mounting a plurality of lighting fixtures to a common mechanical support are disclosed.

30 Claims, 14 Drawing Sheets

Fig. 1C.
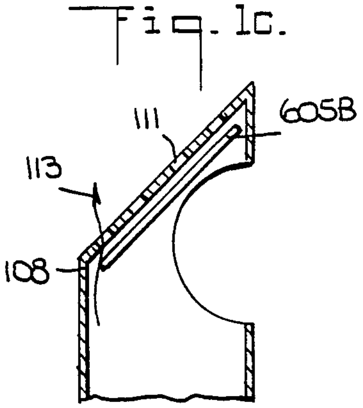
Fig. 1D.
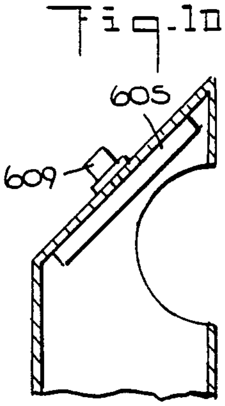
Fig. 1E.
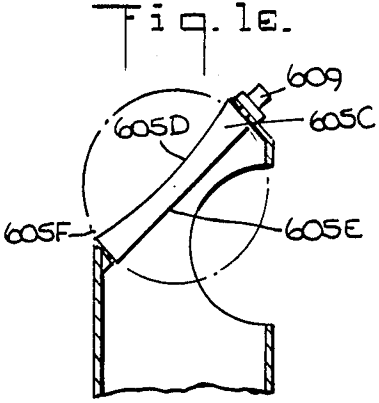
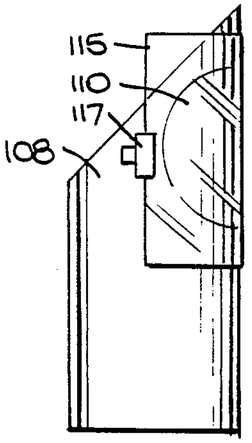
Fig. 1F.
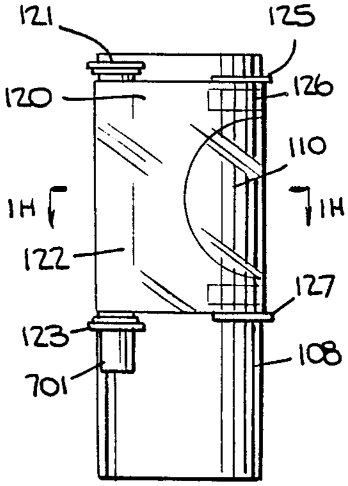
Fig. 1B.
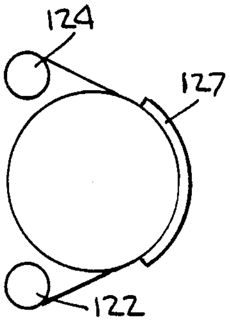
Fig. 1H.

605G
401
201
204
203
101
108
205
207
108B
108A
209
401B
211
210
213
215
634
646

Fig. 6B.
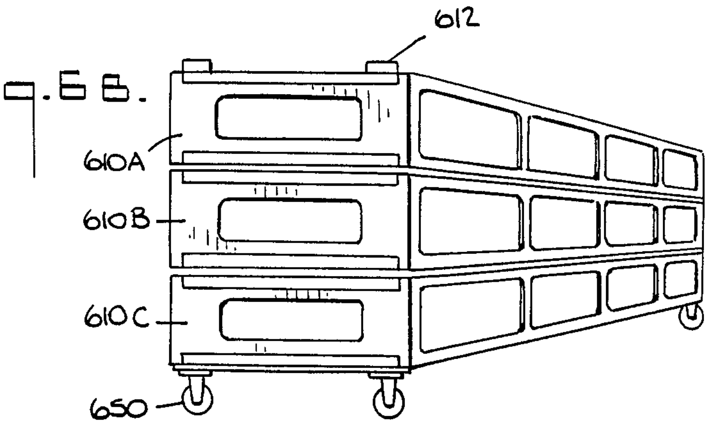
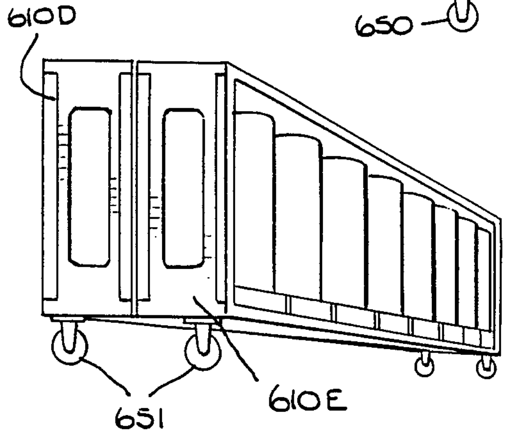
Fig. 6C.
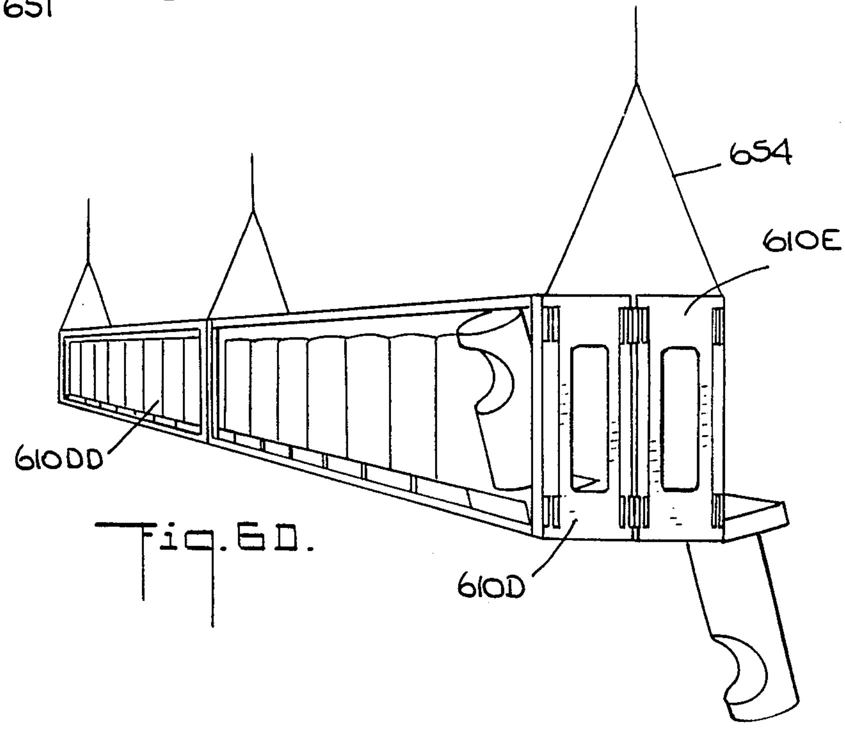
Fig. 6D.

APPARATUS FOR MECHANICALLY ADJUSTING LIGHTING FIXTURE AZIMUTH AND ELEVATION

This application relates to entertainment lighting and, more specifically, to an improved apparatus and method for mechanically adjusting fixture azimuth and elevation.

It represents a continuation-in-part of application Ser. No. 750,873 filed July 1, 1985, now U.S. Pat. No. 4,697,227 and contains subject matter in Disclosure Document No. 147175 dated Feb. 24, 1986.

BACKGROUND OF THE INVENTION

Virtually all of the fixtures used to light stage shows, concerts, films, and television productions produce light beams of directional character, beams whose azimuth and elevation relative to the structure supporting the fixture must be adjusted in order to illuminate the desired subject. In almost every case, the elevation adjustment capability is provided by suspending the fixture housing in the opening of a fork-like yoke or frame. The required azimuth adjustment capability is provided by rotatably mounting the yoke to the supporting structure. The fixture housing is manually rotated in each axis and locked in place by friction at the pivots, for example, as disclosed in U.S. Pat. No. 1,977,883.

This method of adjustment is simple and inexpensive, but it has the disadvantage that the maximum azimuth adjustment on either side of a plane perpendicular to the long axis of a common support, for any given fixture length greater than the fixture width, is inversely related to the spacing between the fixture and an adjacent fixture or obstruction. This requires that the spacing between adjacent elongated fixtures on a common support be increased in order to provide adequate clearance for azimuth adjustment, with the undesirable effect of thus decreasing the number of fixtures which can be accomodated on a given support.

Those fixtures which allow remote adjustment of azimuth and elevation generally employ this method with the addition of motors at the pivots, for example, as disclosed in U.S. Pat. Nos. 1,680,685 and 1,747,279.

This method of remote azimuth and elevation adjustment has several important disadvantages. One is that the entire mass of both the fixture and its yoke must be suspended from the azimuth pivot, and a motor and drive system must be provided having sufficient torque to accelerate this mass to motion and then smoothly decelerate it to a stop at the required position with the contradictory objects of maximum speed and accuracy. The azimuth pivot must further maintain a high degree of stiffness so as not to introduce undesirable motion or error into positioning while minimizing friction, requiring the use of expensive bearings. Further, the very length of the fixture housing increases the problem of inertia presented by its moving mass. Also, changes in the design of the fixture which increase its length, or weight, or change its center-of-gravity can have such impact on the requirements for the azimuth actuator that major changes in the actuator and/or drive may be required. One such change is the addition of a motorized color changer mounted to the front of the fixture. Finally, most productions demand far more azimuth adjustment of a fixture than elevation adjustment, placing the highest workload on the weakest link in the system.

Alternatively, some fixtures have been built with the use of a mirror rotatable in two axes as the method of adjusting azimuth and elevation, a remotely adjustable version disclosed in U.S. Pat. No. 2,054,224. While the motorization of such a fixture is far simpler because of the minimal mass of the mirror, this approach sets severe and generally unacceptable limits on adjustability, for while the azimuth adjustment of such a system is unrestricted, elevation adjustment is limited to within a narrow range on either side of a plane perpendicular to the elongated axis of the fixture housing. Adjustment towards the fixture results in obstruction of the beam by the fixture housing itself, while adjustment away from it results in clipping of the beam as it elongates beyond the edges of the mirror.

It is the object of the present invention to disclose an improved apparatus for adjusting fixture azimuth and elevation, manually or remotely, having none of the disadvantages of prior art methods.

SUMMARY OF THE INVENTION

A light projector, suitable for entertainment lighting and comprising a light source and associated light collecting means producing an elongated beam having an optical centerline is provided with a means, typically a mirror, mounted to a common mechanical support, for redirecting the beam in a plane substantially perpendicular to the optical centerline. Beam azimuth is varied by rotation of the mirror about an axis parallel to the optical centerline.

The mirror, however, may be fixed with respect to elevation, and elevation adjustment provided by the rotation of the common mechanical support (and therefore the beam), about an axis perpendicular to the optical centerline and parallel to the plane of azimuth adjustment.

Such adjustments may be performed manually or by actuators.

The benefits of this method of adjustment are many. The adjustment of azimuth is performed by a low mass mirror, minimizing the actuator and drive requirements for the higher workload portion of the system. Because the mirror remains in a fixed angular relationship with the beam, problems of obstruction and "clipping" are eliminated. While the housing must rotate within a yoke, the yoke itself is fixed with respect to the supporting structure and a comparatively inexpensive pivot and actuator may be employed. Further, during any adjustment of azimuth and elevation, the housing remains perpendicular to the long axis of the supporting structure, and as such the mounting centers between adjacent fixtures can be minimized, maximizing the number of fixtures which can be accomodated on a given supporting structure.

Methods by which the folding of the optical path provided by the azimuth and elevation adjustment means of the present invention may be employed to decrease radiant heat in the beam; to simplify the fitting of remote color changers; and to shorten overall housing length will be disclosed.

The use of a fixed or variable curvature mirror for the beam redirecting means, to provide beam forming or beam size adjustment, will also be disclosed.

The benefits of a supplimentary adjustment of the angle at which the beam is redirected in certain applications will be disclosed.

The unique advantages which attend the use of the beam azimuth and elevation adjustment means of the present invention in portable lighting systems mounting a plurality of fixtures to a common support will be described.

BRIEF DESCRIPTION OF THE DRAWINGS

FIG. 1C is a sectional view of a fixture adapted for the improved azimuth and elevation adjustment method of the present invention, illustrating a method of venting.

FIG. 1D is a sectional view of a fixture adapted for the improved azimuth and elevation adjustment method of the present invention, provided with a variable curvature mirror.

FIG. 1E is a sectional view of a fixture adapted for the improved azimuth and elevation adjustment method of the present invention, provided with dual selectable beam-forming mirrors.

FIG. 1F is a side elevation of a fixture adapted for the improved azimuth and elevation adjustment method of the present invention, provided with a method of retaining color filters.

FIG. 1G is a side elevation of a fixture adapted for the improved azimuth and elevation adjustment method of the present invention, provided with a roller-type filter changer.

FIG. 1H is a plan view of the fixture of FIG. 1G.

FIG. 1I is a sectional view of a fixture adapted for the improved azimuth and elevation adjustment method of the present invention, with a folded optical system.

FIG. 6B is a general view illustrating three of the structures of FIG. 6A stacked for transit.

FIG. 6C is a general view illustrating two of the structures of FIG. 6A interlocked for transit.

FIG. 6D is a general view illustrating the interlocked structures of FIG. 6C in use.

DETAILED DESCRIPTION OF THE INVENTION

Figure 1A:
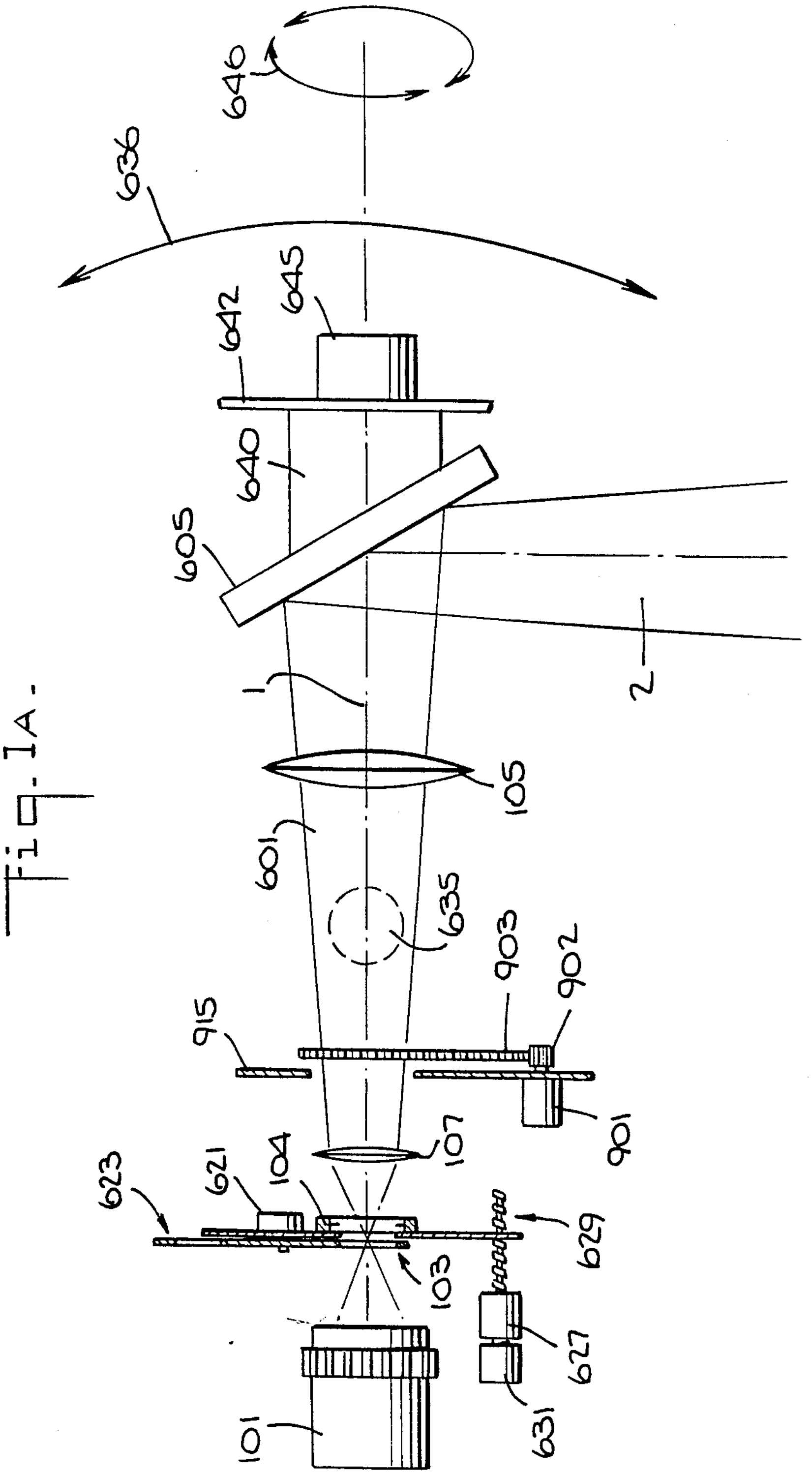
FIG. 1A is a sectional view of a fixture adapted for improved azimuth and elevation adjustment method of the present invention.

Refer now to FIG. 1A of the parent application, reproduced here as FIG. 1A.

A light source with associated light collecting reflector 101 is mounted in a housing. The embodiment illustrated is a framing spotlight, and as such employs two lenses 105 and 107 imaging an aperture 103 for beam-forming. Means are provided to change various beam parameters remotely including intensity (by an electronic dimmer or a dowser and associated actuator), beam size (by iris 104 with an associated actuator), beam shape (by gobo wheel 623 with an associated actuator 621), edge sharpness (by actuator 627), and beam color (by filter array 903 with associated actuator 701). Suitable control systems for each of these parameters are disclosed in U.S. Pat. Nos. 4,527,198, 4,600,976, and in the parent application, which are included in their entirety by reference.

A means, here illustrated as mirror 605, is provided for redirecting the beam at substantially right angles to that section of its optical centerline (here identified with reference numeral 1) that is between the light source 101 and the means for redirecting, mirror 605. Rotation 646 of mirror 605 by actuator 645 about a first axis parallel to the first section 1 of the optical centerline rotates the beam 601 exiting the means for redirecting such that the second section of its centerline (here identified with reference numeral 2) describes a first plane perpendicular to the drawing, representing the required azimuth elevation.

The means for redirecting, mirror 605, may be fixed with respect to the included angle between the first section 1 and the second section 2 of the optical centerline, and the required elevation adjustment provided solely by the rotation 636 of a common mechanical support for light source 101 and mirror 605, here entire housing 642, about a second axis that is perpendicular to the first portion 1 of the optical centerline and parallel to the previously described first plane of azimuth adjustment. In the illustrated embodiment, this second axis extends through the center of actuator 635, perpendicular to the plane of the drawing. The rotation 636 of both light source 101 and mirror 605 by actuator 635 thus rotates the beam through a second plane parallel to the first section 1 of the optical centerline and perpendicular to the first plane of azimuth elevation.

The benefits of this method of adjustment are many and immediate. The adjustment of azimuth is performed by a low mass mirror, minimizing the actuator and drive requirements for the higher workload portion of the system. Because the mirror remains in a fixed angular relationship with the beam, problems of obstruction and "clipping" are eliminated. While the housing must rotate within a yoke, the yoke itself is fixed with respect to the supporting structure and a comparatively inexpensive pivot and actuator may be employed. Further, during any adjustment of azimuth and elevation, the housing can remain perpendicular to the long axis of the supporting structure, and as such the mounting centers between adjacent fixtures can be minimized, maximizing the number of fixtures which can be accomodated on a given supporting structure. Other advantages of this method will become apparent.

Figure 1B:
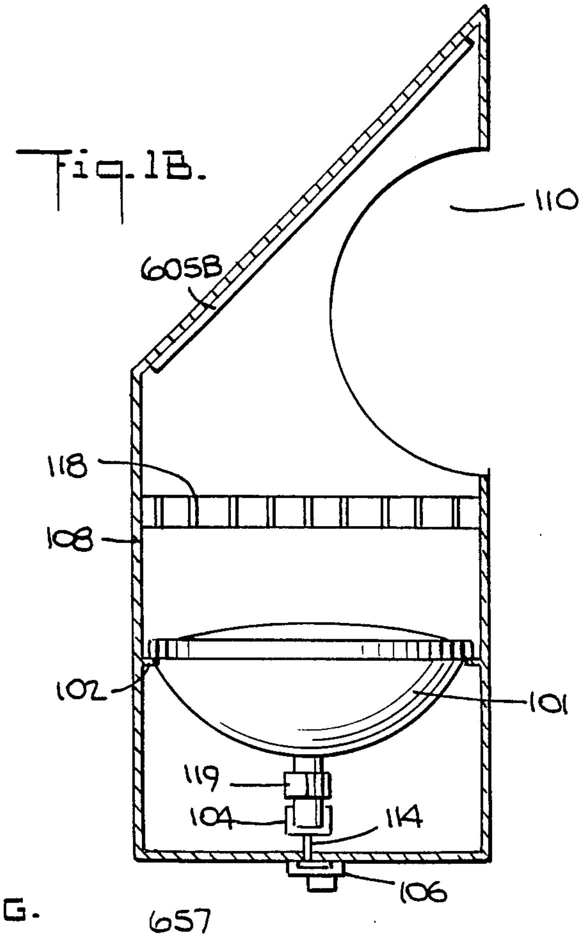
FIG. 1B is a sectional view of a fixture, employing a PAR bulb, adapted for the improved azimuth and elevation adjustment method of the present invention.

Refer now to FIG. 1B, a section of another fixture type adapted for the azimuth and elevation adjustment method of the present invention. The fixture employs a known "PAR" bulb 101, (such as the model FFN as produced by General Electric, Cleveland, Ohio 44112), which includes the light source, light collector, and beam forming means. Bulb 101 rests within a cylindrical metal housing 108 upon a flange 102. Power is supplied to the bulb via connector 119. The required mirror 605B is mounted to the upper portion of the housing 108 at an angle of approximately 45°. Circular aperture 110 provides for the exit of the beam.

Because the PAR type bulb produces a beam of oval shape, a method of rotating the bulb to adjust the orientation of the beam is required. This rotation may be manual, but is here illustrated as a small motor 106 whose shaft 114 is provided with a bracket 104 which engages the bulb socket 119.

A benefit of this fixture construction is the distance between the bulb 101 and exit aperture 110 and the "folding" of the optical path by mirror 605B. This may be used to reduced spill light outside the beam center and to lower heat on the colored gel supported at the opening which, in turn, prolongs its life. The amount of radiant heat in the beam can be very substantially reduced by employing a mirror surface selectively reflecting visible light and absorbing or passing infrared (e.g. a "cold mirror" as produced by Optical Coatings Laboratory, Inc, Santa Rosa, Calif. 95401). This not only further prolongs gel life but increases the comfort of performers. Louvers 118 may also be provided to reduce spill light.

Other benefits of the fixture construction include the ease with which ventilation can be provided. FIG. 1C illustrates the use of the mirror 605B as a light baffle, the housing 108 being provided with large vent holes 111, and heated air 113 rising through the housing, around the perimeter of the mirror 605B, and through the vent holes. Such fixtures can be used in either a "mirror up" or "mirror down" orientation and in either case such a baffling system may be employed.

The mirror employed by the fixture may be flat or, as illustrated in FIG. 1A and 1D it may be of the variable curvature type previously disclosed by the applicant in U.S. Pat. No. 4,460,943, which is included in its entirety by reference, a manual adjustment or actuator 609 changing the curvature of the mirror and with it the characteristics of the beam. Alternatively, a mirror of fixed curvature may be used as a beam-forming element, the mirror preferably cast from a heat-resistant, infrared-transparent plastic. Mirrors of different curvature can be inserted into the housing at setup, or as illustrated in FIG. 1E, two such mirrors 605D and 605E may be mounted back-to-back on a common axle, supported by a pillow block 605F at one end and a knob or actuator 609, allowing the user to change beam characteristics by changing mirrors.

The color of the beam may be altered by any known method. When a single color is used for the fixture, a colored filter may be inserted in the fixture housing, for example, at the level of louver 118. Insertion at this point would restrict ventilation and place the filter unnecessarily close to the bulb. Alternatively, wrapping the flexible filter material 115 around the fixture housing 108 over the opening 110 would serve the object of coloring the beam while maximizing both the distance between bulb and filter and the quantity of airflow. Unlike prior art fixtures which require a rigid metal gel frame to retain the filter, the filter material itself need only be wrapped around the housing and retained by a suitable means such as the spring clip 117 illustrated.

A fixture employing the adjustment method of the present invention may employ a color changer. Where the optical system (such as that illustrated in FIG. 1A) provides a point at which the diameter of the beam is substantially reduced, an internal color changer, such as array 903, may be employed. Where such an internal changer is impractical, the adjustment method of the present invention permits an improved method of installing a "roller" type color changer similar to the known Colormax TM unit. Unlike prior art fixtures which require the installation of the rollers 122 and 124 and actuators 701 and 701A at the front of the fixture where their considerable size complicates making and maintaining both azimuth and elevation adjustments, and where their bulk further limits the side-to-side movement of the fixture without encountering other fixtures, a fixture employing the adjustment method of the present invention may locate the rollers 122 and 124 parallel to the housing 108, supported by brackets 121 and 123, with the gel 120 wrapping around the housing between guide brackets 125 and 127 and riding over Teflon or UHMW tape strips 126. The effect on fixture size and balance of such an arrangement is minimal, and may be further reduced by locating the rollers farther behind the fixture.

Similarly, an external color changer which rotates a cylindrical frame mounting at least two color filters about the central axis of the fixture to bring any one of them into the beam where it exits opening 110, may also be employed.

Problems with prior art motorization of azimuth and elevation of yoke-supported fixtures further increase for lensed optical systems having longer focal lengths and hence longer housings. As illustrated in FIG. 1I, the mirror 605 may also be used to "fold" this optical system by placing the front lens 105B after the mirror, decreasing housing length, and with it inertia.

Refer now to FIG. 2A–2H where various methods of adjusting azimuth are illustrated.

Figures 2A, 2B, 2C, 2D, 2E, 2F, 2G, 2H:
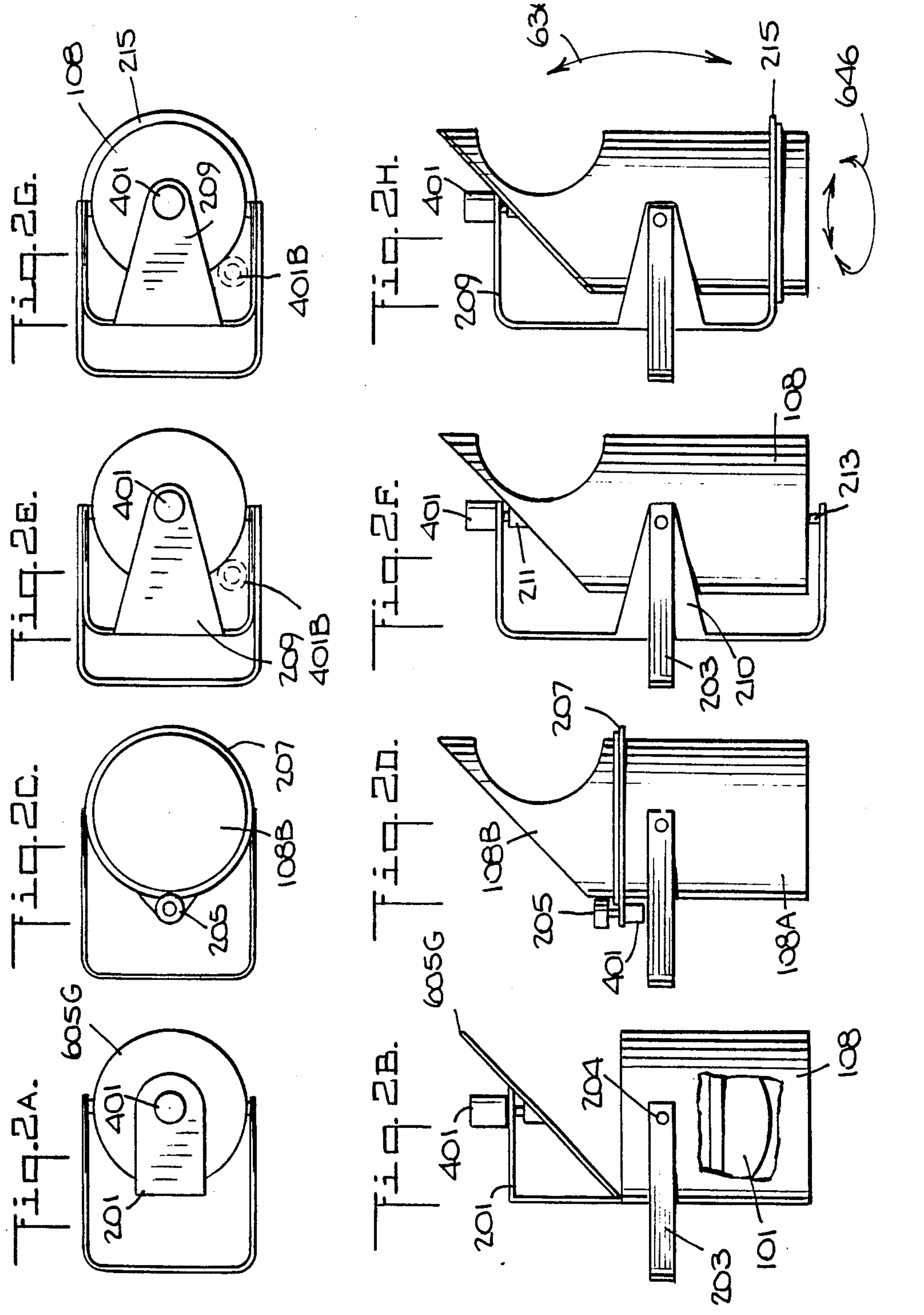
FIG. 2A is a plan view of a fixture adapted for the improved azimuth and elevation adjustment method of the present invention, and using a freely-supported mirror for azimuth adjustment.
FIG. 2B is a side elevation of the fixture of FIG. 2A.
FIG. 2C is a plan view of a fixture adapted for the improved azimuth and elevation adjustment method of the present invention, and rotating that portion of the housing containing the mirror.
FIG. 2D is a side elevation of the fixture of FIG. 2C.
FIG. 2E is a plan view of a fixture adapted for the improved azimuth and elevation adjustment method of the present invention, and rotating the housing about pivots aligned with its central axis.
FIG. 2F is a side elevation of the fixture of FIG. 2E.
FIG. 2G is an alternative embodiment of the fixture of FIG. 2E.
FIG. 2H is a side elevation of the fixture of FIG. 2G.

FIG. 2A and 2B illustrate simple rotation of mirror 605G by a knob or actuator 401 mounted to a bracket 201 attached to the fixture housing 108. The mirror thus moves with respect to the housing, whose second axis of adjustment is here illustrated as rotation about pivot 204 of yoke 203, although any of the methods illustrated in FIG. 3 may be employed.

FIG. 2C and 2D illustrate the division of the housing into a portion 108B including the mirror and opening 110 which is rotatably mounted with respect to the other portion of the housing 108A at bearing flange 207. The rotating portion 108B of the housing may be turned by hand or by means of an actuator 401 here illustrated as mounted to a bracket on the non-rotating portion of the housing 108A and driving the rotating portion 108B by means of a drive wheel 205.

FIG. 2E and 2F illustrate the mounting of the housing 108 for rotation about its centerline. The housing is mounted within a bracket 209 by pivots 213 and pillow block 211, and rotated with a knob or actuator 401. Alteratively, an actuator 401B may be mounted to the bracket and a drive wheel employed to rotate the housing in a manner similar to FIG. 2C and 2D. The bracket 209 supporting the housing must, in turn, be mounted to allow rotation in the second plane, here illustrated as by means of side brackets 210 rotatably attached to yoke 203 at pivots 204, although other methods may be employed.

FIG. 2G and 2H illustrate an alternative method of mounting the housing 108 for full unit rotation, a bracket 215 surrounding the housing, preferably provided with friction-reducing parts bearing on the housing. Like the fixture of FIG. 2E and 2F, the housing may be rotated about its first axis 646 by a knob or actuator 401 at the centerline, or by an actuator 401B equipped with a driving wheel. Clearly other driving methods including belts and gears could equally be used. Unlike the embodiment of FIG. 2E and 2F, the bulb end of the housing 108 is unobstructed, allowing access for lamp changes. Alternatively, the relationship of the centerline pivot and the flange could be reversed, or two flanges could be employed, or a single bearing/flange, preferably close to the center of gravity. Alternatively, a single pivot or bearing flange could be installed at one end of the housing (for example, at enclosure 655 in the case of fixture 608H in FIG. 6A).

Refer now to FIG. 3A–3D where various methods of elevation adjustment are illustrated.

Figure 3A:
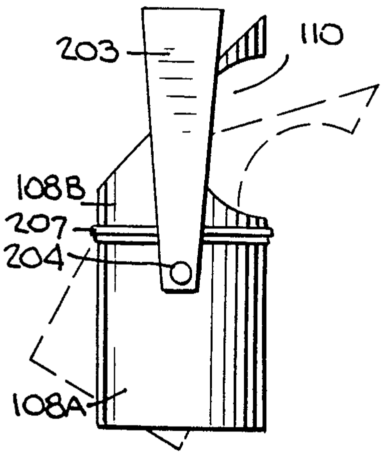
FIG. 3A is a side elevation of a fixture adapted for the improved azimuth and elevation adjustment method of the present invention, and providing elevation adjustment by rotation about a central axis.
Figure 3C:
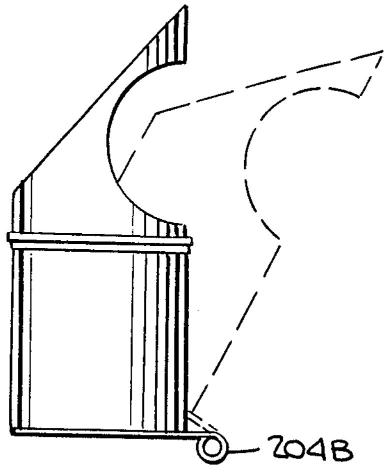
FIG. 3C is a side elevation of a fixture adapted for the improved azimuth and elevation adjustment method of the present invention, and providing elevation adjustment by rotation about an offset axis.
Figure 3B:
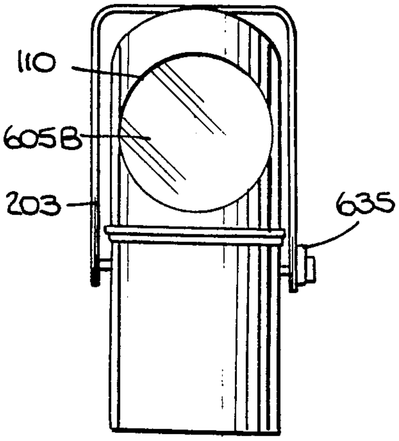
FIG. 3B is a front elevation of the fixture of FIG. 3A.

FIG. 3A and 3B are generic illustrations of a yoke providing suspension from pivot points close to the center of gravity. Yoke 203 provides support from pivot points 204 and a corresponding point on the opposite side of the fixture, and allows rotation (as illustrated by the dashed outline) about the axis through those points. The design of the yoke may be varied to suit the requirements of the application (for example, as illustrated in FIG. 2A–2H) and the adjustment may be manual or motorized (actuator 635 illustrated).

Similarly, any method of azimuth adjustment may be employed, the "split housing" method of FIG. 2C and 2D here illustrated.

Figure 3D:
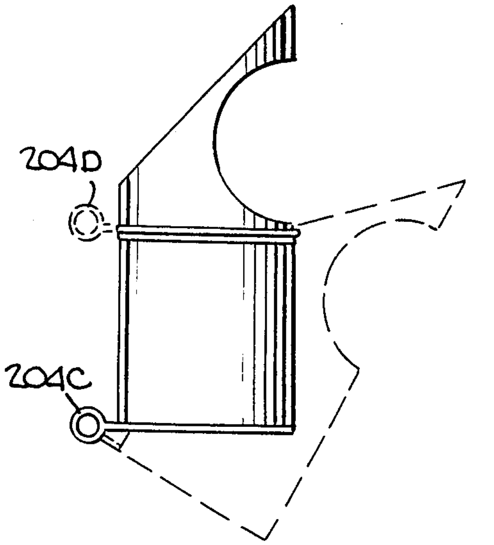
FIG. 3D is a front elevation of the fixture of FIG. 3C.

FIG. 3C and 3D illustrate pivot points outside the envelope of the housing, specifically collars 204B, 204C, and 204D rotating about a tubular member running perpendicular to the plane of the drawing. The advantages of such a method and its eccentric rotation of the fixture, as illustrated by the dashed outlines, will be further described below.

Figure 3E:
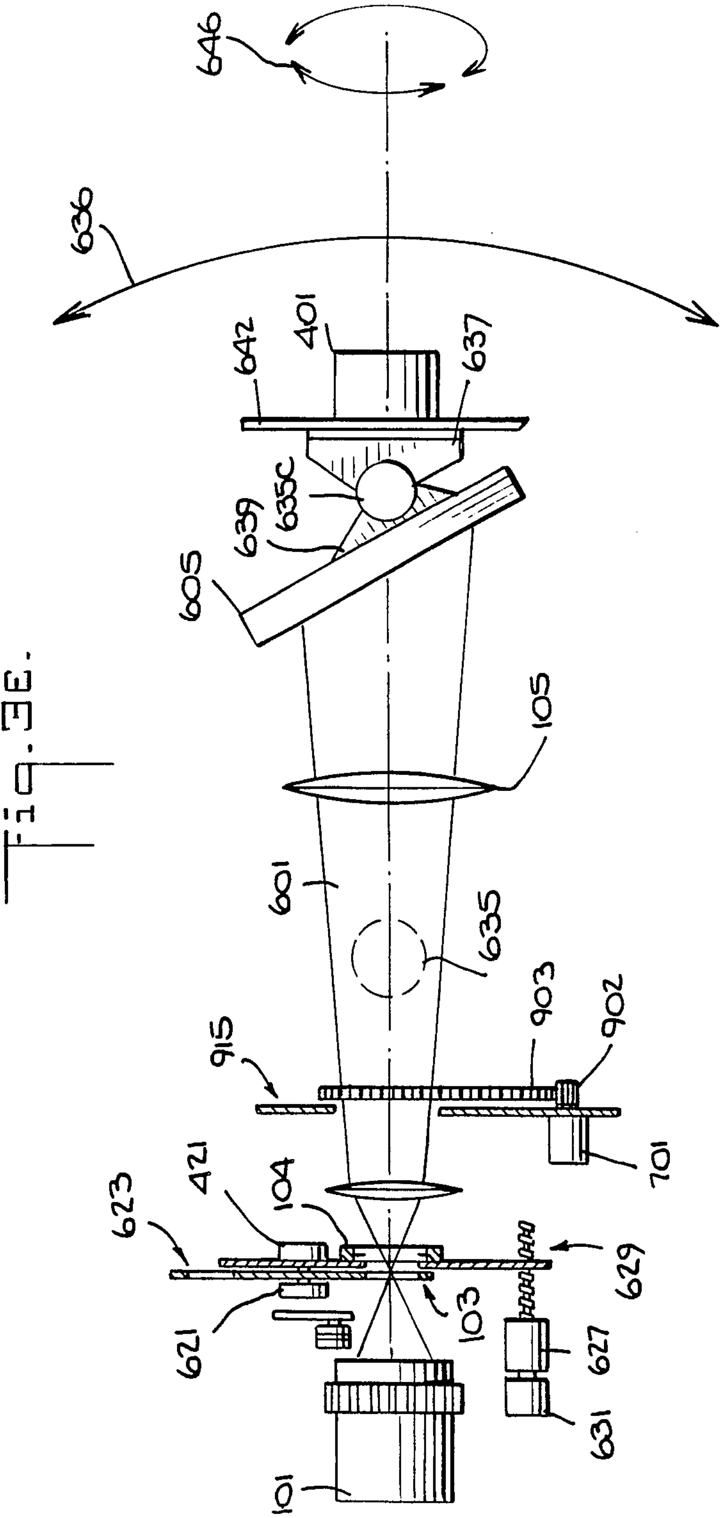
FIG. 3E is a sectional view of a fixture adapted for the improved azimuth and elevation adjustment method of the present invention, and providing compound adjustment of elevation.

While the mirror 605 is not employed for elevation adjustment, FIG. 3E illustrates an improvement for applications like remote followspots which require both large elevation adjustments and comparatively small ones.

As a method of increasing the accuracy and resolution of the system, the mirror 605 may be attached to a first bracket 639, in turn rotatably attached to a second bracket 637, which is driven by the azimuth actuator 401. Comparatively minor and precise adjustments may be made by tilting mirror 605 with a second actuator 635C which varies the angular relationship between first bracket 639 and second bracket 637, while the control system triggers first actuator 635 for major changes in elevation and uses the opportunity to return second actuator 635C to the centerpoint of its travel.

Figure 4B:
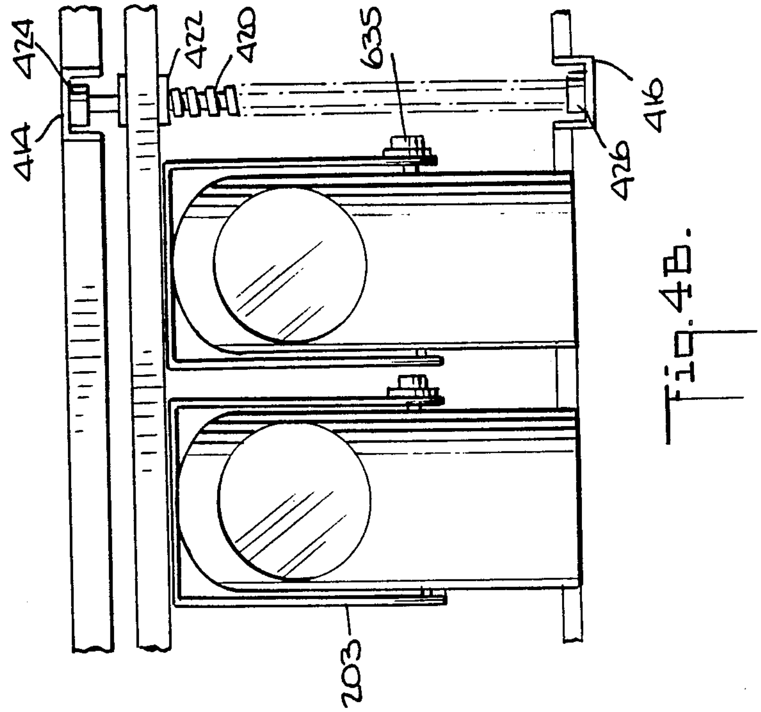
FIG. 4B is a front elevation of the lamp supporting structure of FIG. 4A.
Figure 4A:
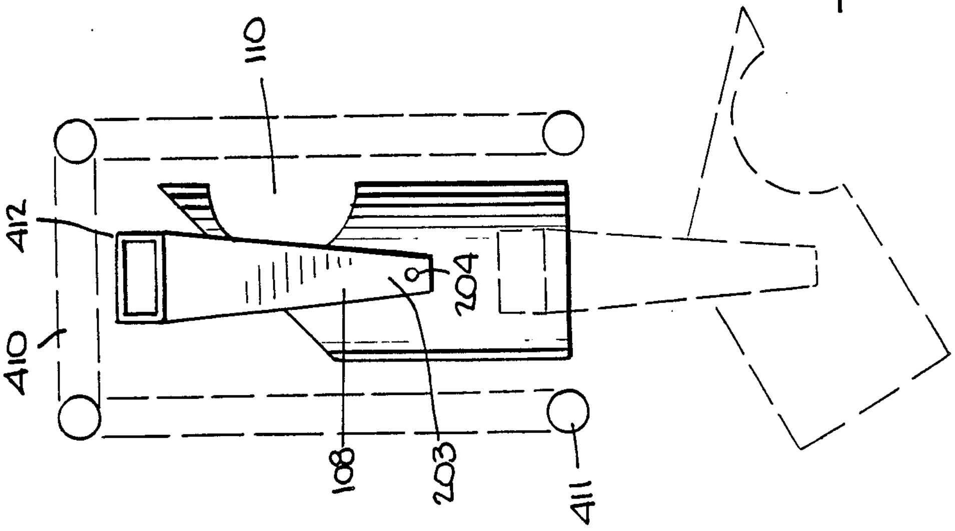
FIG. 4A is a sectional view of a lamp supporting structure containing a plurality of fixtures adapted for the improved azimuth and elevation adjustment method of the present invention.
Figure 4C:
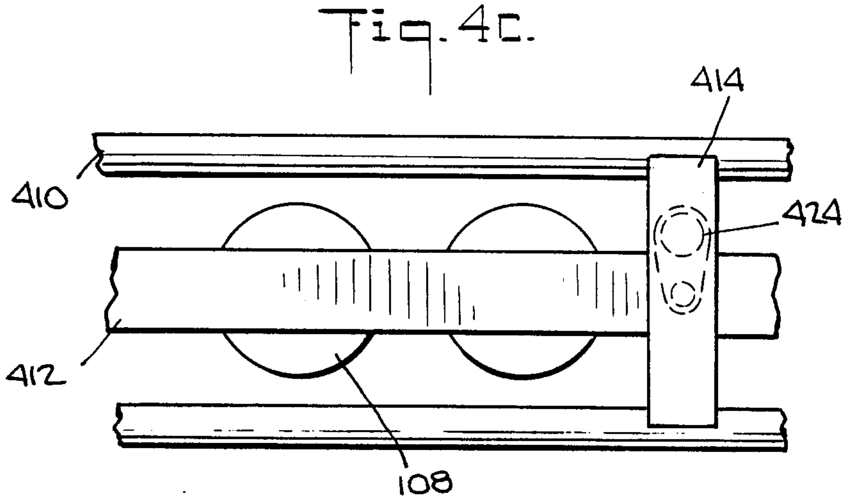
FIG. 4C is a plan view of the lamp supporting structure of FIG. 4A.

FIG. 4A–4C illustrate the advantages of the azimuth and elevation adjustment method of the present invention when applied to the packaging of a plurality of fixtures for portable lighting systems. In such systems, tremendous practical advantages are gained by minimizing the shipping volume of a given number of light fixtures and by minimizing the labor required to prepare them for use. In the past these objects have been contradictory.

One approach to system construction, "lamps off", detaches the fixtures from their supporting structure, packing a dozen or more fixtures in a shipping crate. While this minimizes shipping volume because the fixtures can be packed in a minimum of space, the removal of each fixture from the shipping crate; its mechanical and electrical attachment to the supporting structure; and the adjustment of azimuth and elevation from scratch at each setup, extract a very high cost in labor.

The second approach to system construction, "lamps on", attaches the fixtures, generally in groups of six, to a common bar or pipe, which in turn is shipped in a crate or rack, and attached to the supporting structure at each setup. In other embodiments, lamp bars may slide vertically into the supporting structure for transit, and drop the fixtures clear of the structure for use. All fixtures are reset to vertical before packing to limit crate, rack, or structure width, but the fixtures must remain at the mounting centers required to allow focusing, which results in wasted space. Further, each fixture must be refocused before use and reset to vertical before packing. Thus both shipping volume and labor are compromised.

The third approach to system construction, "lamps in" encloses the fixtures within the supporting structure for both shipping and use in their focused orientation. Setup labor is reduced, but considerable shipping volume is wasted by the need to ship not only the space between fixtures required for azimuth adjustment, but the space between them and the sides of the supporting structure required to allow for elevation adjustment of fixtures.

FIGS. 4A–4C, 5A–5E, and 6A–6G illustrate how the azimuth and elevation adjustment method of the present invention allows a heretofore unprecented reduction in shipping volume without the offsetting increase in labor requirements of prior art methods.

FIG. 4A and 4B are a section and plan illustrating how a plurality of fixtures employing the azimuth and elevation adjustment method of the present invention may be mounted to a common member 412, here illustrated as an aluminum extrusion, which may also serve to distribute electrical power to the fixtures. As will be apparent from FIG. 4B, a front elevation, the azimuth and elevation adjustment method of the present invention allows reducing the mounting centers between fixtures to a minimum, increasing shipping efficiency. A common member with a plurality of such fixtures may be shipped in a crate or, as illustrated here, be mounted within the supporting structure 410 such that the fixtures can be raised within the structure for shipping (solid outline) and lowered clear of it (dashed outline) for use. This may be accomplished manually or by actuator. FIG. 4A and 4B illustrate a lead screw 420 supported between brackets 414 and 416 and driven by actuator 424, causing the ball nut 422 to ride up or down the length of lead screw 420, raising or lowering the fixtures with it.

Alternatively, as illustrated in FIG. 5A–5D, the elevation adjustment method of FIG. 3C or 3D may be employed.

In such an embodiment, the bracket assembly 209/215 supporting the fixture housing 108 may be attached to a collar 204B rotating about one lower chord of structure 410. An actuator, here illustrated as linear actuator 635B, causes rotation of the collar about the lower chord, the eccentric placement of the pivot point with respect to the fixture causing the housing to be rotated out of the envelope of the supporting structure 410 such that its members will not obstruct the beam exiting opening 110.

Figure 5C:
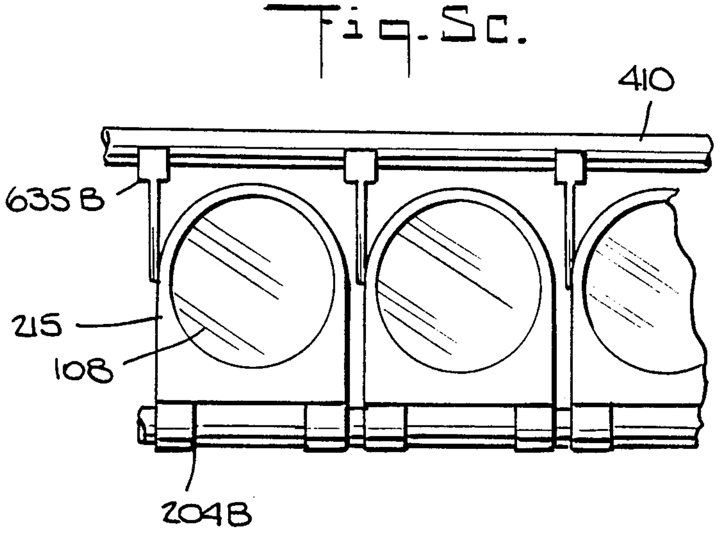
FIG. 5B is a front elevation view and FIG. 5C is a top elevational view of the lamp supporting structure of FIG. 5A.
Figure 5B:
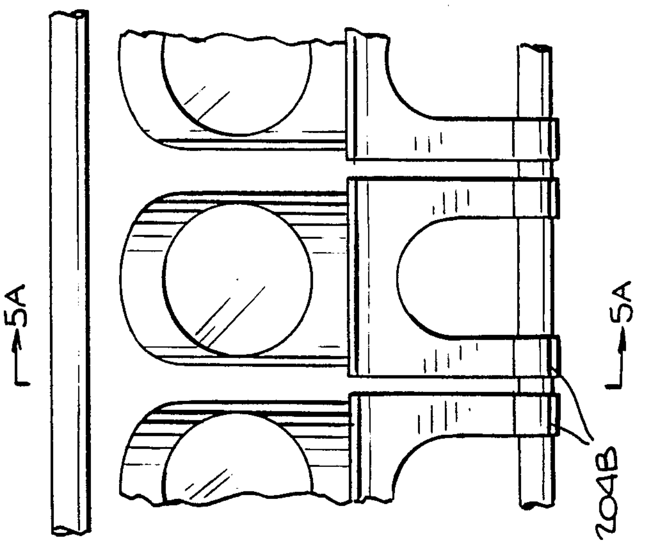
Figure 5A:
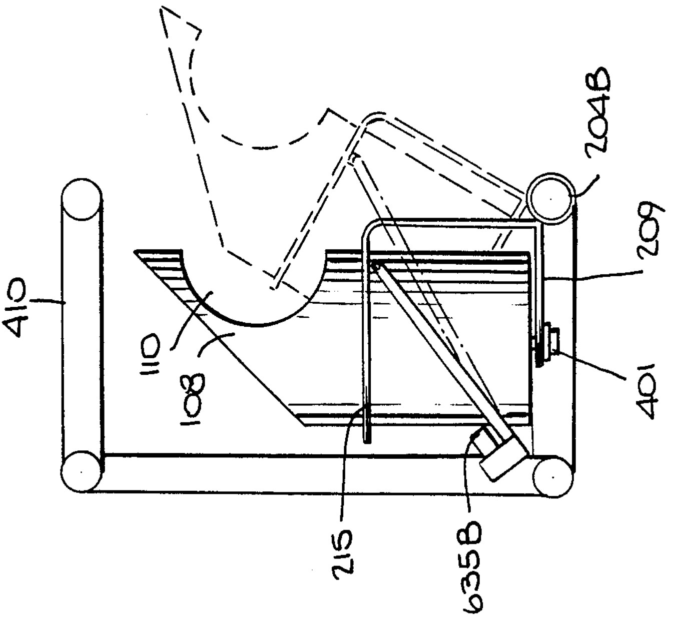
FIG. 5A is a sectional view of a lamp supporting structure adapted for the offset elevation adjustment method of FIG. 3C.
Figure 5D:
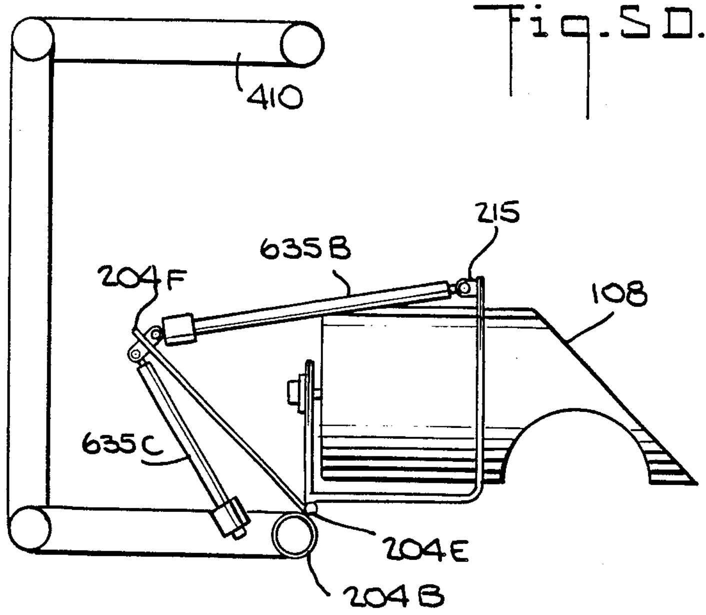
FIG. 5D is a sectional view of the lamp supporting structure of FIG. 5A adapted for compound elevation adjustment.
Figure 5E:
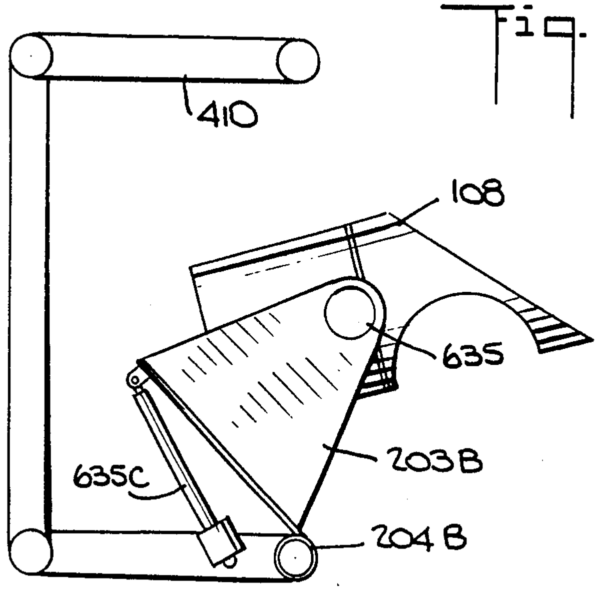
FIG. 5E is a sectional view of the lamp supporting structure of FIG. 5A adapted for an alternative method of compound elevation adjustment.

Alternatively, the required range of elevation adjustment may be provided by means of a compound arrangement, such as illustrated in FIG. 5D and 5E, which employs two or more elevation adjustment means.

Referring to FIG. 5D, fixture housing 108 is attached by means of bracket assembly 209/215 to a pivot 204E, which allows for its rotation relative to a subchassis 204F urged by actuator 635B. Subchassis 204F is, in turn, attached to a pivot/collar 204B, which allows for its rotation about one lower chord of structure 410, urged by actuator 635C. As a result, the mechanical design of some actuator systems may be simplified.

FIG. 5E illustrates that a compound elevation adjustment means also allows the use of fixtures having a central pivot design with the supporting structure 410. Fixture housing 108 is attached by means of a central axis to a bracket/yoke assembly 203B, and rotated by actuator 635. Bracket/yoke assembly 204B is, in turn, attached to a pivot/collar 204B, which allows for its rotation about one lower chord of structure 410, urged by actuator 635C.

It will be understood that either one of the compound elevation adjustments may be by manual means, and that, particularly in the embodiment of FIG. 5E, that the subchassis may require only a "stowed" and an "extended" position.

It will further be understood that while a separate subchassis and/or actuator 635C may be provided for each of the plurality of fixtures in a section of supporting structure, that a common manual or powered actuator, or common subchassis and single actuator, may be used for a plurality of fixtures.

It will be understood that while the fixtures illustrated all employ the improved azimuth and elevation adjustment method of the present invention, that other fixture types of less directional character such as known PAR-36 and PAR-46 arrays and known "broad" and "cyclorama" fixtures can be employed in such a lamp supporting structure, preferably by adapting them such that their output is directed at an angle perpendicular to the long axis of the fixture; that the required azimuth adjustment is performed by the rotation of the fixture about that long axis; and the required elevation adjustment performed by rotation of the housing through a plane parallel to it.

While a supporting structure for a single row of fixtures is illustrated, it will be understood that supporting structures may be designed which incorporate two or more rows of fixtures, and that one or both of the methods illustrated in FIG. 4 and FIG. 5 may be employed.

Figure 6G:
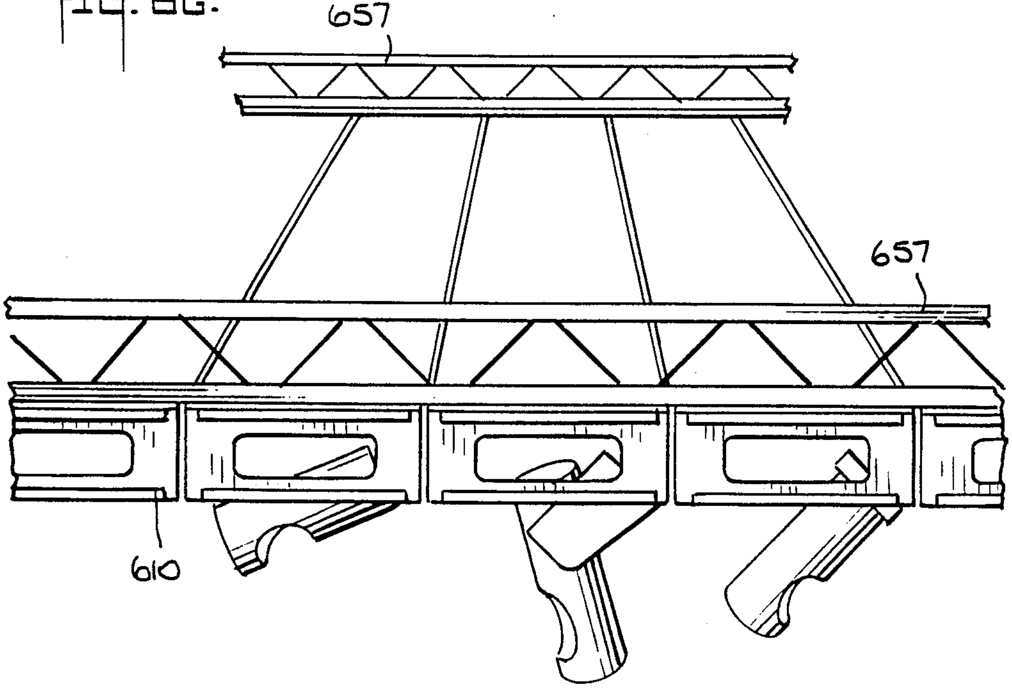
FIG. 6G is a general view illustrating a plurality of the structures of FIG. 6A interlocked to form a horizontal array.
Figure 11:
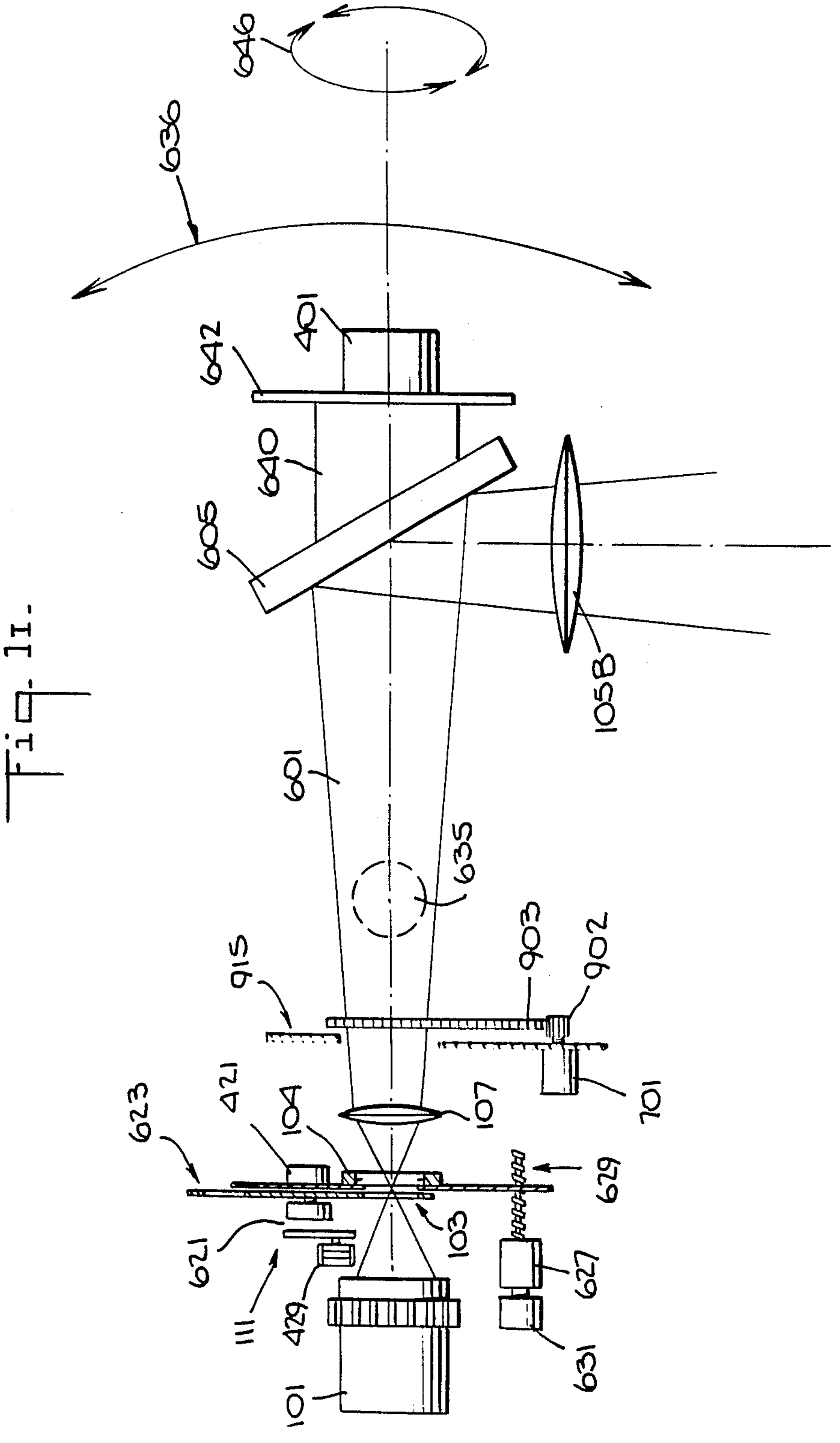
Figure 6A:
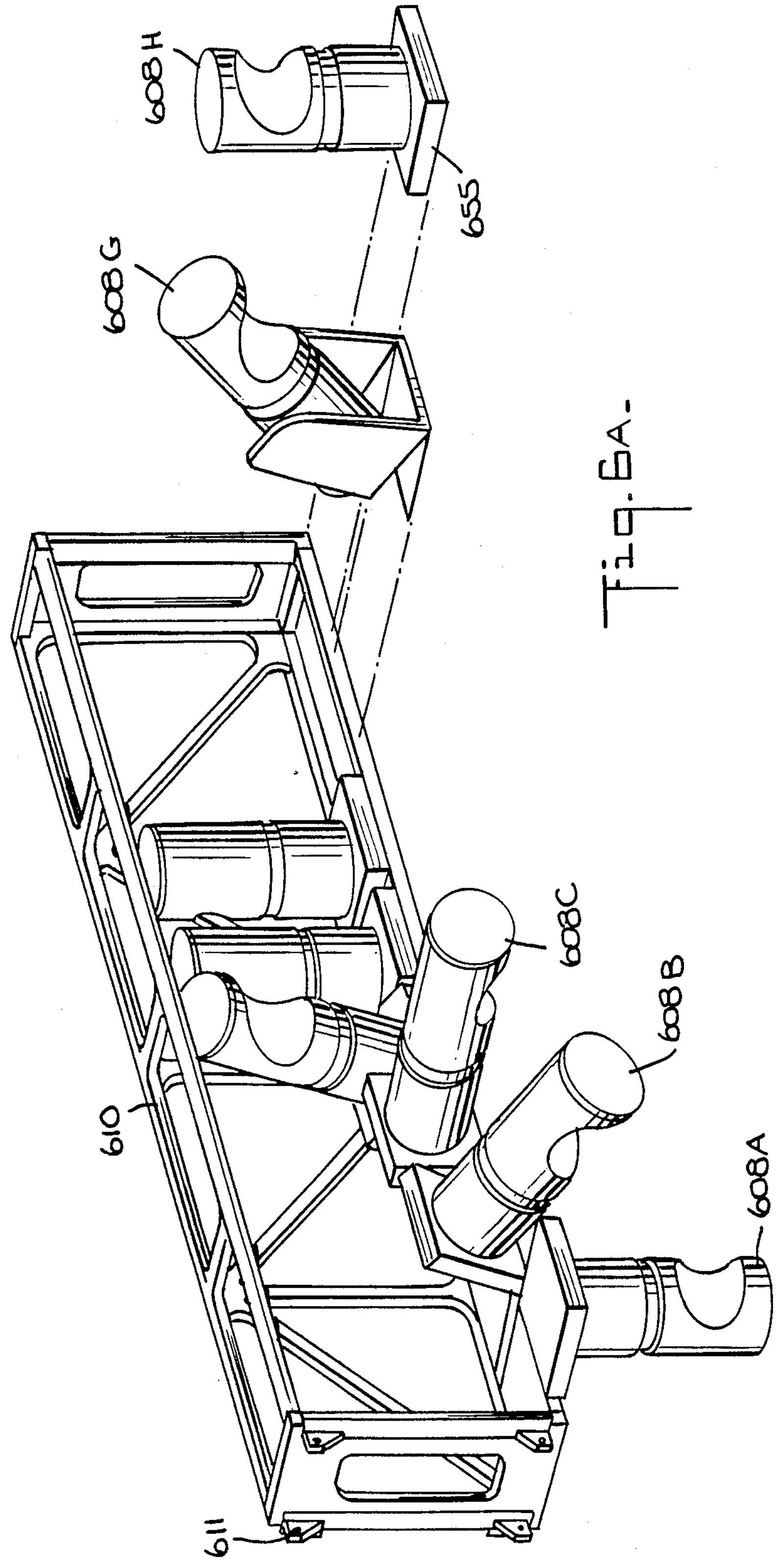
FIG. 6A is a general view of one embodiment of a lamp supporting structure employing fixtures adapted for the improved azimuth and elevation method of the present invention.

Refer now to FIG. 6A where one embodiment of a lamp supporting and enclosing structure employing fixtures adapted for the azimuth and elevation adjustment method of the present invention particularly suited to portable use is illustrated.

A section of lamp enclosing structure 610 preferably measures approximately 30" in height, 11" in depth, and 96" in length, these dimensions making the most efficient use of truck space.

Due to the unique advantages of the azimuth and elevation adjustment method of the present invention, one such section can accomodate at least eight fixtures 608A–608H in a volume which permits a 40% reduction in the volume of truck space required by a given number of fixtures relative to the present standard lamp enclosing truss structure—while requiring less setup labor. Further, any number of such fixtures may provide motorized adjustment at no penalty in space requirements.

For example, referring to FIG. 6B, three such sections 610A–610C can be stacked face down on a common dolly or casterboard 650, interlocked by means of fittings 612 protruding from the rear side of each section. The resulting stack accomodates 24 fixtures in a volume only 3" higher than a prior art lamp enclosing truss accomodating only 12.

Alternatively, the fittings 612 of any two sections 610 may be used to interlock the sections back-to-back, four such sections accomodating 64 fixtures in the same volume as three sections of prior art lamp enclosing truss accomodating only 36.

The unprecedented reduction in shipping volume comes at no cost in flexibility, for the illustrated truss section can be adapted to a greater number of desirable configurations than any prior art lamp enclosing truss design.

Single sections may be joined by means of provided clevis fittings 611 (or by other suitable means), to form single row trusses of any length.

As illustrated in FIG. 6D, sections interlocked back-to-back, as illustrated in FIG. 6C, may then be joined lengthwise by means of provided clevis fittings 611, to form double row trusses of any length.

Figure 6F:
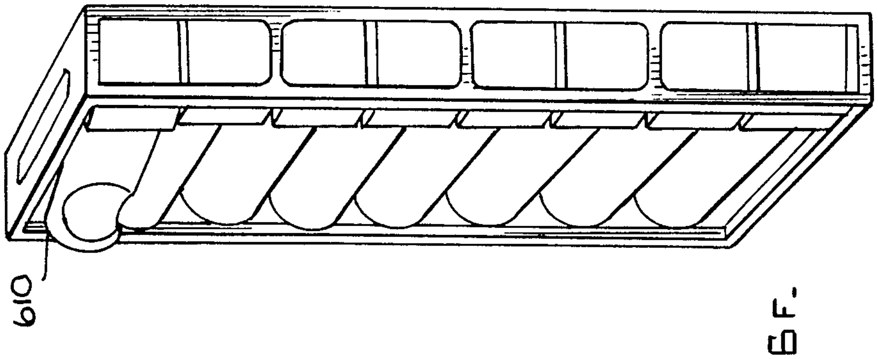
FIG. 6F is a general view illustrating one of the structures of FIG. 6A in use as a vertical ladder.
Figure 6E:
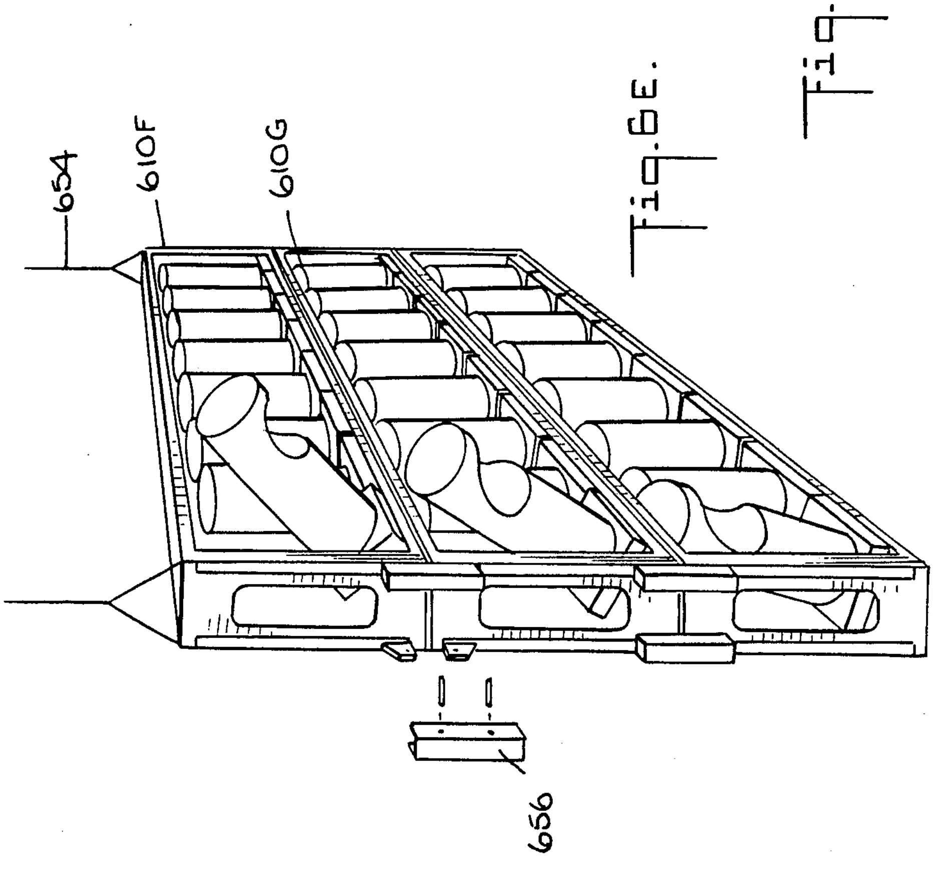
FIG. 6E is a general view illustrating three of the structures of FIG. 6A interlocked in a vertical array.

As illustrated in FIG. 6E, sections can be stacked, hung, or interlocked by any suitable means (here brackets 656 joining clevis fittings 611) to form vertical arrays.

As illustrated in FIG. 6F, sections can be stood or hung vertically.

And as illustrated in FIG. 6G, sections can be interlocked to each other or to a common supporting structure (here putlogs 657 using fittings 611) to form horizontal arrays.

Figure 6H:
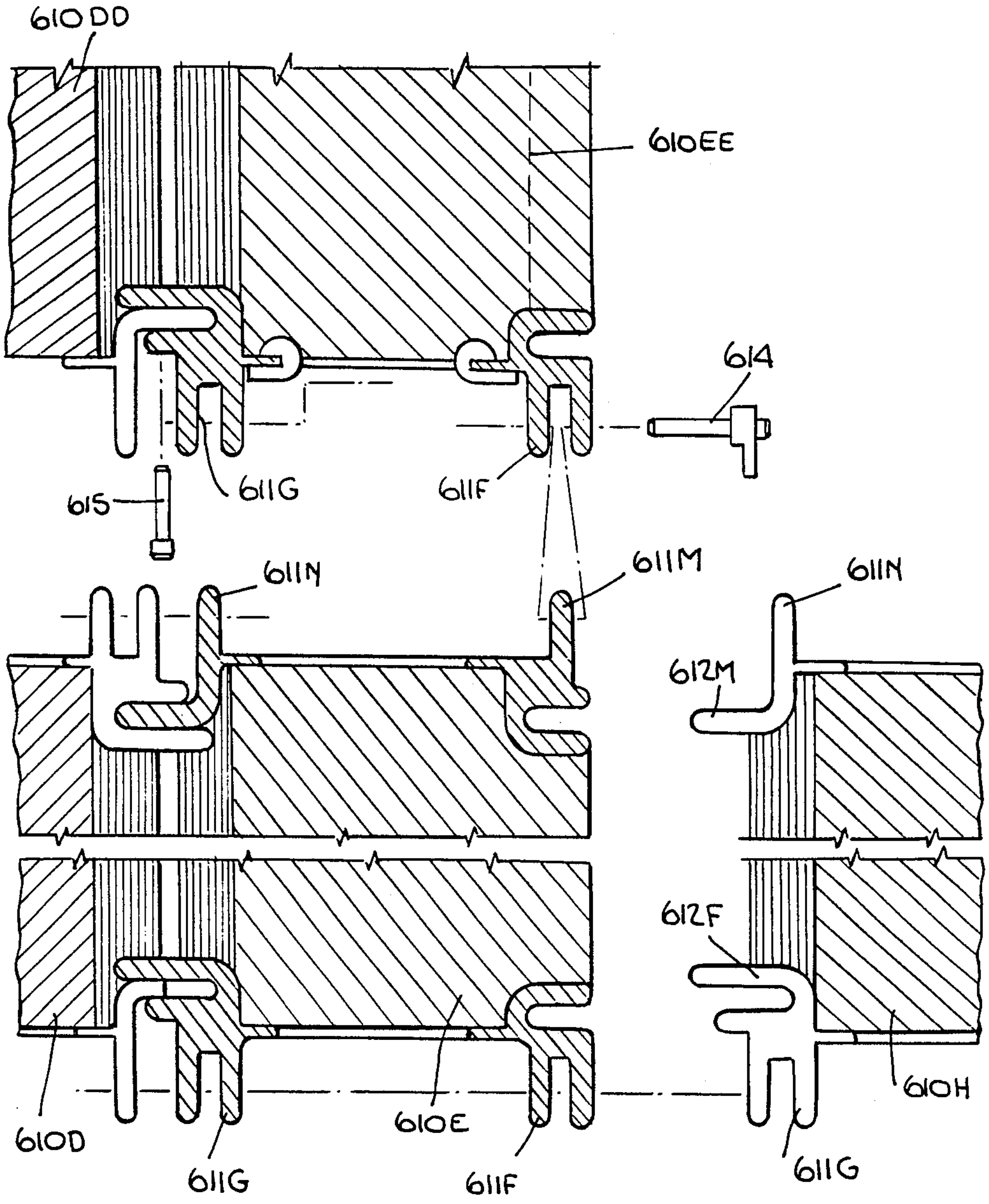
FIG. 6H is a sectional view illustrating one possible embodiment of suitable fittings for interlocking the sections.

FIG. 6H is a sectional view illustrating the operation of one possible design for fittings 611 and 612.

Fittings 612M and 612F, protruding from the rear side of structure 610, permit both the stacking of sections back-to-front (as illustrated in FIG. 6B and shown here in the case of sections 610E and 610H) and the interlocking of sections back-to-back (as illustrated in FIG. 6C and shown here in the cases of sections 610D and 610E and of sections 610DD and 610EE). Male fittings 611M and 611N of one section mate with female fittings 611F and 611G of a second section to permit the assembly of both single row structures and the double row structure illustrated in FIG. 6D.

Preferably, a variety of fixtures employing different light sources, optical systems, and azimuth and elevation adjusting means will be adapted to a common modular format such that any combination (e.g. 608G and 608H) may be inserted in a section of supporting structure.

Preferably, electronic dimmers (such as disclosed in a copending application, included in its entirety by reference) and the actuator electronics required by each fixture will be mounted in the same modular unit (e.g. in enclosure 655 of fixture 608H) or in an associated modular unit, which mechanically and electrically connects with the supporting structure 610, the supporting structure also serving to distribute power and signal from a single multi-pole inlet connector.

Preferably, the fixtures are also adapted to permit their use independent of the supporting structure (for example as "floor specials"), as well as their external attachment to it (where a limited number of additional fixtures insufficient to justify adding an entire section is required).

Preferably, a local control system as disclosed in the parent application will be provided for each fixture or section.

It will be apparent that a section can be designed whose operation is similar to that of FIG. 4A–C, and which may be used and interlocked with the design of FIG. 6A, and that the dimensions of either section may be varied.

While fixtures which fully integrate the azimuth and elevation adjustment method of the present invention have been illustrated, it will be apparent that this method could be retrofitted to prior art fixtures by means of an appropriate adaptor.

Similarly, while the use of a mirror as the means to redirect the beam has been illustrated, it will be apparent that other suitable means, such as prisms or other optical components or systems may be employed. It will be apparent that the optical system of a fixture may employ an additional mirror or beam redirecting means for any one of a variety of purposes (including heat reduction and/or folding of the optical path). While manual and powered rotation are disclosed, it will be apparent that other suitable actuating methods (including flexible shafting and pneumatics) may be employed. And while the illustrated embodiments rotate the beam for azimuth adjustment by rotation of the means for redirecting, it will be apparent that electro-optical and acousto-optical components which allow beam displacement without physical motion of the component may become practical for the application.

It will be apparent that the improved azimuth and elevation adjustment method of the present invention may be applied to a variety of fixture types having a variety of optical systems, and that accordingly some fixture types will incorporate unified light collecting and beam forming means (such as the PAR bulb of FIG. 1B), while other fixture types may employ additional components for beam forming which may be prior to (e.g. lenses 105 and 107 of FIG. 1A); integral with (e.g. the variable curvature reflector of FIG. 1D); or after (e.g. lens 105B of FIG. 1I) the means for redirecting.

It will also be apparent that while the illustrated embodiments redirect the beam at a fixed angle substantially perpendicular to the optical centerline, that greater or lesser angles could be employed and/or that some preadjustment of angle could be provided, and that in such a case, the previously described first plane of adjustment would be conic in shape.

While the illustrated embodiments are oriented such that redirecting the beam within the first plane adjusts azimuth, it will be apparent that they may also be mounted such that it adjusts elevation.

Other variations within the spirit of the invention will be apparent to those of skill in the art, and should not be understood as limited except by the scope of the claims.

What is claimed is:

1. A light projector capable of remote beam azimuth and elevation adjustment comprising: a light source; means for forming a beam suitable for entertainment lighting, said beam having an elongated optical centerline; coaxial optical means for redirecting said beam, said redirection of said beam defining at least a section of said beam incident upon said means for redirecting and further defining a section of said beam redirected by said means for redirecting; first means including at least a first remotely-adjustable actuator for rotating at least said means for redirecting such that said redirected section of said beam may be rotated both through a first plane substantially perpendicular to said centerline in said incident section of said beam and about an effective axis substantially coincident with said centerline in said incident section of said beam; second means including at least a second remotely-adjustable actuator for rotating at least said means for redirecting through a second plane, said second plane both parallel to said centerline in said incident section of said beam and substantially perpendicular to said first plane, said rotation of at least said means for redirecting by said second means for rotating about an effective axis substantially perpendicular to said centerline in said incident section of said beam, substantially parallel to said first plane, and substantially horizontal; and means for maintaining a substantially fixed angular relationship between said centerline of said beam in said incident section and said centerline of said beam in said redirected section during remote adjustment of both the azimuth and elevation of said beam by said first and said second remotely-adjustable actuators.

2. A light projector capable of remote beam azimuth and elevation adjustment comprising: a light source;

means for forming a beam suitable for entertainment lighting, said beam having an elongated optical centerline; coaxial optical means for redirecting said beam, said redirection of said beam defining at least a section of said beam incident upon said means for redirecting and further defining a section of said beam redirected by said means for redirecting, said centerline in said incident section of said beam and said centerline of said beam in said redirected section defining an included angle; first remotely-adjustable means for rotating said redirected section of said beam about an axis substantially coincident with said centerline of said beam in said incident section; and second remotely-adjustable means for rotating said redirected section of said beam about an effective axis both substantially perpendicular to said centerline in said incident section of said beam and substantially horizontal, while substantially maintaining said included angle, whereby said beam may be effectively adjusted in azimuth and elevation by said first and said second remotely-adjustable means for rotating while substantially maintaining said included angle.

3. Apparatus according to claim 2, and further including remotely-adjustable means coupled with said means for redirecting for modifying said included angle.

4. Apparatus for remotely adjusting a beam of light in substantially any direction comprising a first support; a light source mounted on the first support; means for forming a beam suitable for entertainment lighting, said beam directed along a first axis fixed in relation to said first support; a second support mechanically coupled to said first support so as to permit rotation of at least said second support about an effective axis substantially coincident with said first axis; a first remotely-adjustable means for rotating at least said second support about said first axis; a means for redirecting said beam at an angle relative to said first axis, said means for redirecting mechanically coupled to said second support so that said first axis passes through said means for redirecting in all angular positions of said second support about said first axis; a mounting means, said first support mechanically coupled to said mounting means so as to permit rotation of said first support relative to said mounting means about a second axis and substantially horizontal; and a second remotely-adjustable means for rotating said first support about said second axis.

5. Apparatus according to any of claims 1, 2 or 4, wherein said means for redirecting comprises at least one reflective surface.

6. Apparatus according to claim 5, wherein said reflective surface comprises a substantially plane reflective surface.

7. Apparatus according to claim 5, wherein said reflective surface is shaped so as to comprise a beam forming element.

8. Apparatus according to claim 5, wherein said reflective surface is a variable curvature surface.

9. Apparatus according to claim 5, wherein said means for forming a beam includes at least one lens located in said redirected section of said beam.

10. Apparatus according to claim 1 or 4, and further including remotely-adjustable actuator means coupled with said means for redirecting for modifying said angular relationship between said centerline of said beam in said incident section and said centerline of said beam in said redirected section.

11. Apparatus according to claim 10, wherein said means for redirecting comprises at least one reflective surface, and wherein said remotely-adjustable actuator means for modifying comprises a third remotely-adjustable actuator.

12. Light projector supporting apparatus, comprising at least one elongated structural means for supporting a plurality of light projectors in a spaced relationship along the elongated axis of said structural means, at least a plurality of said light projectors mechanically coupled to said elongated structural means for supporting, capable of individual adjustment of both beam azimuth and elevation, and comprising: a light source; means for forming a beam suitable for entertainment lighting, said beam having an elongated optical centerline; coaxial optical means for redirecting said beam, said redirection of said beam defining at least a section of said beam incident upon said means for redirecting and further defining a section of said beam redirected by said means for redirecting; first means for permitting rotation of said redirected section of said beam through a first plane both substantially perpendicular to said centerline in said incident section of said beam and about an effective axis substantially coincident with said centerline in said incident section of said beam; second means for permitting rotation of at least said means for redirecting through a second plane, said second plane both parallel to said incident section of beam and substantially perpendicular to said first plane, said rotation of at least said means for redirecting by said second means for rotating about an effective axis maintained substantially perpendicular to said incident section of said beam, substantially parallel to said first plane, and substantially parallel to said elongated axis of said structural means; and means for maintaining a substantially fixed angular relationship between said centerline of said beam in said incident section and said centerline of said beam in said redirected section during adjustment of both the azimuth and elevation of said beam by said first and said second means for permitting rotation.

13. Apparatus according to claim 12, wherein said means for permitting rotation comprise remotely-adjustable actuators.

14. Apparatus according to claim 12, wherein said means for redirecting comprises at least one reflective surface, and further including means to mechanically couple a plurality of said lamp supporting apparatus to form a larger structure.

15. Apparatus according to claim 14, wherein said means for permitting rotation comprise remotely-adjustable actuators.

16. Light projector supporting apparatus, comprising at least one elongated structureal means for supporting a plurality of light projectors in a spaced relationship along the elongated axis of said structural means, at least a plurality of said light projectors capable of individual adjustment of both beam azimuth and elevation and comprising: a first support; a light source mounted on the first support; means for forming a beam suitable for entertainment lighting, said beam directed along a first axis fixed in relation to the first support; a second support mechanically coupled to said first support so as to permit rotation of at least said second support about an effective center substantially coincident with said first axis; a means for redirecting the beam at an angle relative to said first axis, said means for redirecting mechanically coupled to said second support so that said first axis passes through said means for redirecting in all angular positions of said second support about said first axis; a mounting means mechanically coupled to said elongated structural means for supporting, said first support mechanically coupled to said mounting means so as to permit rotation of said frist support about a second axis substantially perpendicular to said first axis and substantially parallel to said elongated axis of said structural means.

17. Apparatus according to claim 16, and further including remotely-adjustable actuators for rotating at least said second support about said first axis and for rotating said first support about said second axis.

18. Apparatus according to claim 16, wherein said means for redirecting comprises at least one reflective surface, and further including means to mechanically couple a plurality of said lamp supporting apparatus to form a larger structure.

19. Apparatus according to claim 18, and further including remotely-adjustable actuators for rotating at least said second support about said first axis and for rotating said first support about said second axis.

20. Apparatus according to claim 12 or 16, wherein said means for forming includes at least one lens located in said redirected section of said beam.

21. Apparatus according to claim 12 or 16, and further including means to mechanically couple a plurality of said lamp supporting apparatus to form a larger structure.

22. Apparatus according to claim 12 or 16, wherein said means for redirecting comprises at least one reflective surface.

23. Apparatus according to claim 22, wherein said reflective surface comprises a substantially plane reflective surface.

24. Apparatus according to claim 22, wherein said reflective surface is shaped so as to comprise a beam forming element.

25. Apparatus according to claim 22, wherein said reflective surface is a variable curvature surface.

26. Apparatus according to claim 12 or 14, wherein said means for permitting rotation permit direct manual adjustment.

27. Apparatus according to any one of claims 12, 16, 14, 13, 15, 18, 17, or 19, wherein said lamp supporting apparatus defines a volume that substantially encloses said plurality of said plurality of light projectors in at least one orientation of said projectors, whereby said projectors may be enclosed within said lamp supporting apparatus during shipping.

28. Apparatus according to claim 27, wherein said rotation about said axis substantially parallel to said elongated axis of said structural means displaced at least said means for redirecting exterior to said volume.

29. Apparatus according to claim 27, wherein said elongated structural means for supporting is adapted for displacement relative to said lamp supporting apparatus such that at least said means for redirecting of said plurality of projectors may displaced exterior to said volume defined by said lamp supporting apparatus.

30. Apparatus according to claim 29, wherein at least one remotely-adjustable actuator means is provided to perform such displacement.

* * * * *

UNITED STATES PATENT AND TRADEMARK OFFICE

CERTIFICATE OF CORRECTION

PATENT NO. : 4,769,743

DATED : September 6, 1988

INVENTOR(S) : Michael Callahan

It is certified that error appears in the above-identified patent and that said Letters Patent is hereby corrected as shown below:

Column 13, line 37, change "coupIed" to --coupled--.

Column 13, line 43, after "axis", insert --both substantially perpendicular to said first axis--.

Column 14, line 50, change "structureal" to --structural--.

Column 16, line 21, change "displaced" to --displaces--.

Signed and Sealed this

Thirty-first Day of January, 1989

*Attest:*

DONALD J. QUIGG

*Attesting Officer*

*Commissioner of Patents and Trademarks*